Aug. 11, 1964

F. M. VAN TILLO 3,144,556

APPARATUS TO MEASURE THE REFLECTION COEFFICIENT
WITH RESPECT TO A REFERENCE MEASUREMENT
OF A MATERIAL WHEN CONVEYED PAST
A RADIATION SOURCE

Filed Nov. 30, 1961

INVENTOR.
FRANCISCUS M. VAN TILLO
BY
Cushman, Darby & Cushman
ATTORNEYS

Aug. 11, 1964         F. M. VAN TILLO         3,144,556
      APPARATUS TO MEASURE THE REFLECTION COEFFICIENT
         WITH RESPECT TO A REFERENCE MEASUREMENT
              OF A MATERIAL WHEN CONVEYED PAST
                     A RADIATION SOURCE
Filed Nov. 30, 1961                          2 Sheets-Sheet 2

INVENTOR.
FRANCISCUS M. VAN TILLO
BY
Cushman, Darby & Cushman
ATTORNEYS

_United States Patent Office_

3,144,556
Patented Aug. 11, 1964

3,144,556
APPARATUS TO MEASURE THE REFLECTION COEFFICIENT WITH RESPECT TO A REFERENCE MEASUREMENT OF A MATERIAL WHEN CONVEYED PAST A RADIATION SOURCE
Franciscus M. van Tillo, Heerlen, Netherlands, assignor to Stamicarbon N.V.
Filed Nov. 30, 1961, Ser. No. 155,973
Claims priority, application Netherlands Nov. 30, 1960
5 Claims. (Cl. 250—83.3)

The present invention relates to a new and improved apparatus for determining the reflection coefficient of a substance or material which conveyed past a radiation source operative to measure the reflection coefficient with repsect to a reference measurement.

An apparatus of this general character is described in H. Dijkstra dn B. S. Sieswerda, "CendreX" apparatus for continuous determination of the ash content of coal, Colliery Engineering, October 1959. In this apparatus, the two planes of a radiation beam projection are placed symmetrically with respect to the radiation source and the measuring device. Each plane has the shape of a rectangle, the long side of each is two to three times as long as the short side. Combined, these two planes form a figure which approximates a square. The distance between the radiation source and the planes of projection is rather large due to the space required by the beam chopper means—which continuously and automatically intercepts the two beams, and a compensator—which equalizes the radiation intensity received, so that at any moment the position of the compensator is a measure of the reflection coefficient of the substance. This distance is further rendered large due to the need for obtaining an adequately large radiation area, as there will be only slight variation in the intensity of radiation on the planes of projection, even at the opposed short sides of the two rectangles.

In order to receive the reflected radiation in the most efficient manner, a measuring device is placed as close as possible to the planes of projection. As to the effect of the reflected radiation on this measuring device, there is a significant difference whether the radiation comes from the short sides of the rectangles which are close to the measuring device, or from the opposite short sides of the rectangles. In this known apparatus, an automatic compensator works parallel to the long side of the rectangle across the full width of the projection plane of the reference beam. One reason for this arrangement is that, as the compensator is worked sideways, the sinusoidal variation in the passage of the rays would be disturbed.

An object of this invention is to provide a new and improved apparatus of the character described which obviates these shortcomings of the prior art. There is provided by this invention a means for moving the material to be tested past a radiation projection plane to receive a beam of rays, which beam of rays also strikes a fixed reference plane position. The radiation beam source is positioned obliquely above the projection planes. Beam chopper means are provided to continuously and automatically intercept the two beam portions and there is likewise provided means for measuring the intensity of both of the beams of rays reflected both by the material to be examined and the reference plane, these beams being at an angle in the order of 90° with the incident beams from the radiation source. The operation of this invention is such that if the radiation intensities which are measured differ, the measuring device transmits an impulse to automatic compensating means, which latter is constructed and arranged to equalize the radiation intensities which are received, so that at any moment, the position of this compensating means is a measure of the reflection coefficient of the substance.

Further according to this invention, means are provided for increasing the intensity of the radiation received, as the planes of projection are arranged so that the plane of symmetry passing through the incident rays and the measuring means divides the two projection planes in half, the plane of projection on the substance to be tested being adjacent to the measuring device, and the projected reference beam being operative in conformity therewith.

As contrasted with the known apparatus, the square formed by the two planes of projection have been turned through an angle of 90° in order to provide a plane of projection on either side of the plane of symmetry of the radiation beam.

In the present apparatus, there is provided considerably reduced difference in intensity between the reflected rays detected from points near the one outermost side (one of the long sides) of the rectangle, and the reflected rays detected from the opposite side of the plane of projection of the material.

Another object of the present invention is to provide an apparatus for determining the reflection coefficient of a substance which is of more compact construction than heretofore known, and wherein the beam chopper means is more conveniently accessible. The beam chopper means, which continuously and alternately interrupts the two beams of rays in such a way that (the properties of the substance remaining equal) the sum of the rays passing through remains constant and must be turned through an angle of 90°. This is an advantageous feature due to the fact that, if the chopper means is an eccentric cylinder which is directly driven from a motor, this motor need not be mounted between the measuring means and the radiation source together with the compensating means.

Compensating means according to this invention include a slide for equalizing intensities of the radiations received, the slide being operable to cover or block only a strip in the center of the material projection plane. The direction of the slide movement is substantially normal to the longitudinal axis of this plane. It has been found that by virtue of this arrangement, a virtually linear relationship between the position of the compensator and the reflection coefficient of the substance can be achieved, and intensity of the radiation received being relatively high throughout the compensator range.

The sinusoidal variation in the passage of the rays is slightly distorted, but it has been found that the above sum of the radiations received from the reference projection plane and the material projection plane need only be determined by the average value, and not by momentary value. Compensation does not take place over the full length; and, consequently, there is a relatively long path for adjustment.

Further according to this invention, the instrument range is achieved by the provision of a mechanical compensator operable to be moved over the two planes of projection in a direction generally perpendicular to the automatic compensator.

Yet further according to this invention, the material projection plane and the reference projection plane can extend beyond the homogeneous radiation area of the beam. Heretofore, the radiation source has been placed in such a distance from these planes as to place the beams entirely within the homogeneous portion of the beam of rays. This was considered necessary for making the relation between the compensation and the reflection between the material as nearly linear as possible. Consequently, the radiation beam was not fully utilized, as the homogeneous radiation area is surounded by a broad ring wherein the intensity decreases towards the periphery thereof.

Due to the transverse position of the two planes of projection and the novel method of compensation, which provides intense radiation, the position of the extremities of these planes of projection with respect to the homogenerous beam is of no consequence. A non-linear operation over the manual compensator is not important, as the automatic compensating means operates in the homogeneous intensity radiated area.

Still further according to this invention, the radiation source may be placed appreciably closer to the planes of projection than heretofore, when these planes are the same size. The position and size of the beam chopper means, of course, is altered to conform to these conditions. By virtue of this arrangement, there is a considerable decrease of noise, less space is required for the compensator and chopper, and the distance between the radiation source and the two planes of projection can be decreased as much as 14 cm. e.g. from 28 cm. to 14 cm. By virtue of the asymmetric arrangement, the area of the material projection plane can advantageously be larger than that of the reference projection plane, which is composed of a material with a higher reflection coefficient than otherwise. Also, more radiation strikes the material projection plane so that the measurement sensitivity is materially increased.

Still further objects, advantages, and novel features of the present invention will become apparent in the specification and claims, taken with the accompanying drawings.

Figure 1:
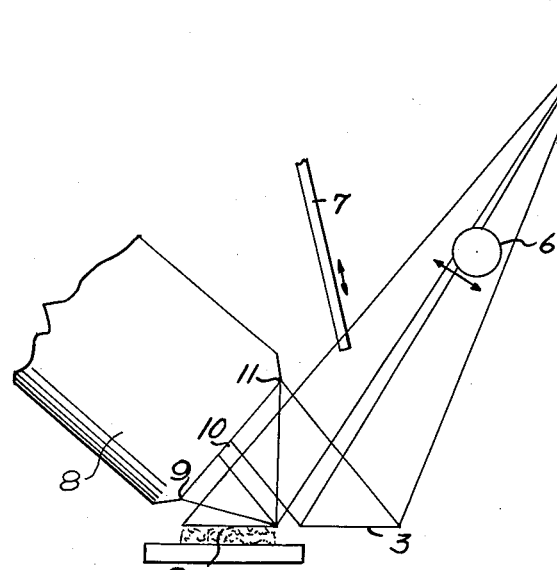
FIGURE 1 is a diagrammatic elevation view of the apparatus according to this invention.
Figure 2:
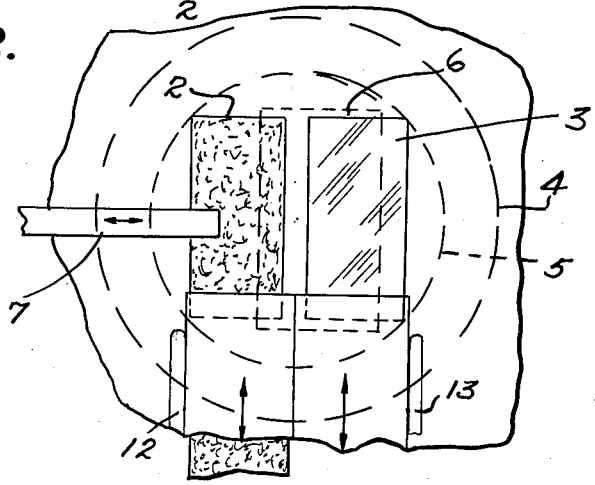
FIGURE 2 is a plan view of the planes of projection in FIGURE 1 disposed in a homogeneous field of radiation.
Figure 3:
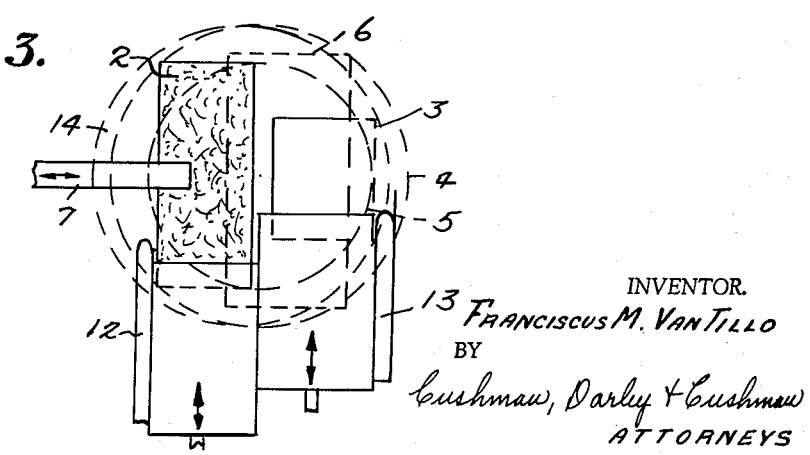
FIGURE 3 is a plan view of the planes of projection, of different sizes and placed in a non-homogeneous field of radiation.
Figure 4:
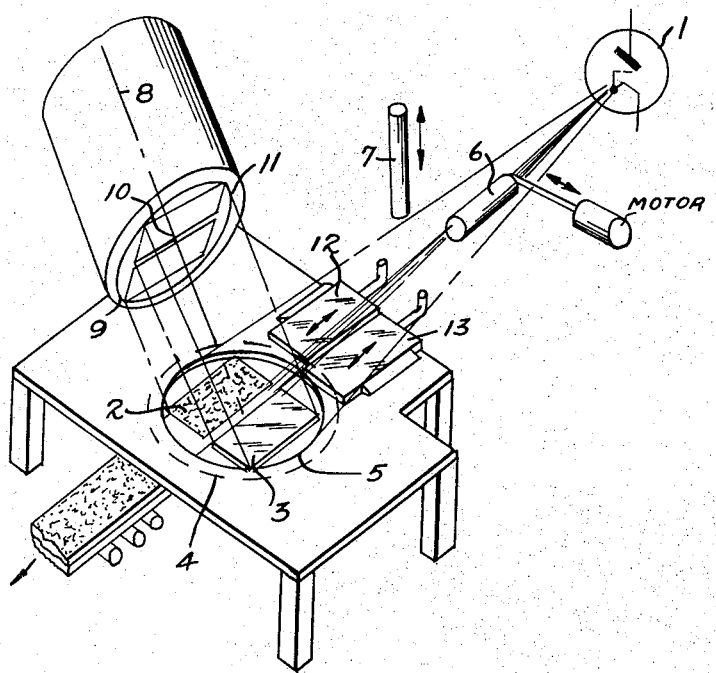
FIGURE 4 is a perspective view of the apparatus.
Figure 5:
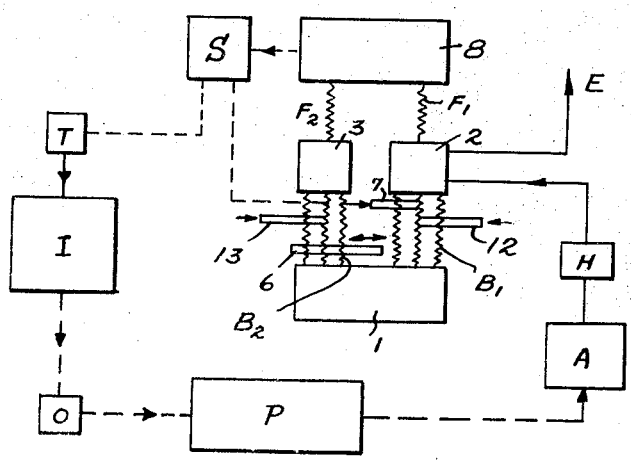
FIGURE 5 is a block diagram representing a technical process, in which the apparatus according to the invention is applied.

Reference is now made to the drawings, FIGURES 1 and 5 are showing a radiation source such as an X-ray tube 1 of conventional construction. This tube 1 projects a beam of rays symmetrically divided into two portions, obliquely on to a material projection plane 2 and a reference projection plane 3. As will be appreciated, if the rays are not partially intercepted, the largest possible plane of projection would be an ellipse, if the beam has a circular cross section. By virtue of the construction of the tube 1, however, the beam is somewhat flattened so the projection is more or less circular. The periphery of this area of radiation projection is indicated in FIGURES 2 and 3 by a circle 4. A circle 5, concentrically disposed within the circle 4, provides homogeneous radiation, i.e., in every point within the circle 5 the radiation intensities are of substantially equal magnitude. In the non-homogeneous area between the circles 4 and 5, the intensity decreases toward the circle 4, as is apparent.

A beam chopper 6 is positioned intermediate the radiation source 1 and the planes 2 and 3 and typically comprises an eccentrically rotatable cylinder as described in United States application Serial No. 236,124 which teaching is included herein by reference.

An automatically adjustable compensator 7 is positioned in the path of the beam, and a measuring device such as a photo multiplier 8 adjacent the plane 2, receives the beams of rays reflected by the planes of 2 and 3.

The longitudinal center line of the measuring device 8 passes approximately through the center of the circle 5. The material projection plane 2 is formed by an opening in a surface of a table top, or the like, past which is conveyed a stream of fine coal, for example, which ash content is to be determined. The coal is conveniently carried by conventional conveyor means. The reference projection plane 3 conveniently is a flat plate having a surface of "Perspex" or chromium-nickel 18–8 steel.

Although the photo multiplier 8 receives the beam from the plane 2 as well as from the plane 3 over the space between the points 9 and 11, which constitute the lower and upper end of the end surface thereof, the most significant portion of the rays reflected by the plane 2 is received over the distance between the points 9 and 10, numeral 10 constituting the reflected boundary of the rays 2 and 3 and is substantially the midpoint of the end surface of the photo multiplier 8.

The most significant portion of the rays reflected between the reference projection plane 3 is recived by the photo multiplier between the points 10 and 11.

Individually, manually operable compensators 12 and 13 are positioned for movement across the planes 2 and 3 to provide adjustment of the instrument. Thus, by shifting only the compensator 13 covering the reference projection plane 3 the measuring range is conveniently adjusted.

As will be appreciated, the planes of projection 2 and 3 need not be in the same plane; the reference plane 3 may be placed in a higher level and in an oblique position, as desired.

Referring now to FIGURE 2, the planes of projection 2 and 3 are disposed entirely within the homogeneous radiation area within the circle 5. The beam chopper 6 reciprocates rapidly so that the mean of the total radiation received by the photo multiplier 8 is always constant. If the composition of the material at the material projection plane 2 changes, the quantities of radiation reflected by the two planes of projection 2 and 3 onto the photo multiplier 8 no longer compensate one another and the photo multiplier gives off an A.C. voltage signal. This signal is operative to displace the compensator 7, the position of which is a measure of the property of the substance that is measured.

Referring now to FIGURE 3, the circle 4 replaces the circle 5 in FIGURE 2 so that the non-homogeneous area is now also used for making measurements. The radiation source (X-ray tube 1) is placed much closer to the planes of projection so the intensity of the rays reflected is of considerably higher order. The automatic compensator 7 operates in that part of the homogeneous area where the intensity of the rays received is the highest. The reflection coefficient of the plane of projection 3 is higher than that of the substance to be measured for two reasons: due to the greater distance of the photo multiplier, and due to the smaller area. The quantity of radiation received can be still further increased by displacing the photo multiplier 8 so that the viewing areas is limited by the circle 14. With the known apparatus, it usually takes 15 minutes until, in a discontinuous determination of the means of value of the ash content of the coal, the same can be determined with an accuracy of 0.3% ash. With the apparatus according to the present invention, the ash content can be read on a meter with an accuracy of 0.1% ash after only 30 to 40 seconds.

In instances where zero adjustment and compensation have become impossible, a material with a higher reference reflection coefficient can be used for the plane 3.

Concerning FIG. 5, the numbers correspond with the numbers of FIGS. 1–4. P stands for a technical process in which an automatic quality control is to be applied in dependence on variation in the specific radiation reflection coefficient of a solid product employed in or resulting from the process. An automatic sampler A takes a continuous sample of such a product, which sample is treated in a device H, in such a manner, e.g., by successive drying and grinding, that a sample of the grain size desired for the reflection measurement is obtained. In the measuring apparatus, the sample is spread out and intercepts the ray beam B, from the radiation source 1 in the projection plane 2. After being measured the sample is discharged from the system along the way denoted by E;

in the event that the material under test is costly, the sample substance may be returned to the process P. The radiation F, which is reflected from the sample is continuously compared, by means of the photoelectric detection device 8, with the radiation F2 reflected from the reference projection plane 3, placed in the path of a second ray-beam B2 also emanating from the source 1. The impulses from the detection device 8, which result from differences in proportionality between the radiations reflected in the planes 2 and 3, are fed to a servo-mechanism S, which operates the compensator 7 in such a way that the amount of radiation reflected by the plane 2 is constantly made proportional e.g. equal to the amount of radiation which is at the same moment reflected by the plane 3. After having been suitably transformed in a transformation organ T, the output signals of the servo-mechanism S are simultaneously fed to an integrator V, which integrates these over a short time and converts these into a measuring impulse, which is fed to a controlling organ O, which brings about the desired quality control in the process P.

When the reflection coefficient is to be utilized to determine the ash content of coal, the difference between the maximum and minimum measurable value of the particular coal to be measured, or the instrument span, can be adjusted to, e.g., 6% ash, 21% ash, or the like, irrespective of the measuring range simply by shifting the manual compensators 12 and 13. By shifting only the compensator 13 over the reference projection plane 3, the measuring range can be adjusted. In the above example of 6% ash, the measuring range may be chosen from 4–10%, 15–21%, 47–53% ash; etc.

In the above example of 21% ash instrument span, the measuring range may be selected 4–25%, 30–51% ash, or the like. The compensators 12 and 13 may consist of the ends of broad adjusting screws, which are easily accessible in the arrangement set forth herein.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative and not in a limiting sense.

What is claimed is:

1. An apparatus for determining the reflection coefficient of a material comprising:
   (1) a radiation source for emitting an incident beam of rays;
   (2) a station positioned to receive the beam of rays from said source and reflect the same at an inclined angle in the order of 90° with respect to the incident beam, and including:
      (a) reference projection plane; and
      (b) a material projection plane adjacent to said reference projection plane;
   (3) means for conveying material to said material projection plane for exposure to said beam;
   (4) beam chopper means for continuously and alternately intersecting the beam portions projected upon said planes;
   (5) means for receiving and measuring the intensities of the beam portions reflected by said planes wherein a difference in measurement of the radiation intensity projected from said planes provides a control impulse;
   (6) automatic movable compensator means receiving said control impulse and equalizing the radiation intensities, the position thereof being a measure of the reflection coefficient of the material at said material projection plane; and
   (7) said projection planes being arranged at said station so that a plane of symmetry passing through the incident rays and reflected to said measuring means divides the two planes in half, said material projection plane being disposed adjacent said measuring means relative to said reference projection plane.

2. Apparatus defined in claim 1 wherein said automatic compensator means includes a movable slide for equalizing the intensity of the radiations received from said measuring means, said slide being operative to block a strip in the center of said material projection plane, the direction of movement of said slide being substantially normal to the longitudinal axis of said material projection plane.

3. Apparatus defined in claim 2 including: instrument means, manual compensators for adjusting the range of said instrument means, said manual compensators being constructed and arranged to be shifted over said projection planes in a direction substantially perpendicular to said slide.

4. Apparatus defined in claim 2 wherein said beam projects a homogeneous radiation area and a non-homogeneous radiation area, said projection planes extending beyond said homogeneous radiation area.

5. Apparatus defined in claim 4 wherein said material projection plane is larger than said reference projection plane.

References Cited in the file of this patent

UNITED STATES PATENTS

| 2,884,130 | Bosch | Apr. 28, 1959 |
| 2,914,676 | Dijkstra et al. | Nov. 24, 1959 |

FOREIGN PATENTS

| 793,301 | Great Britain | Apr. 16, 1958 |